Patented Nov. 25, 1952

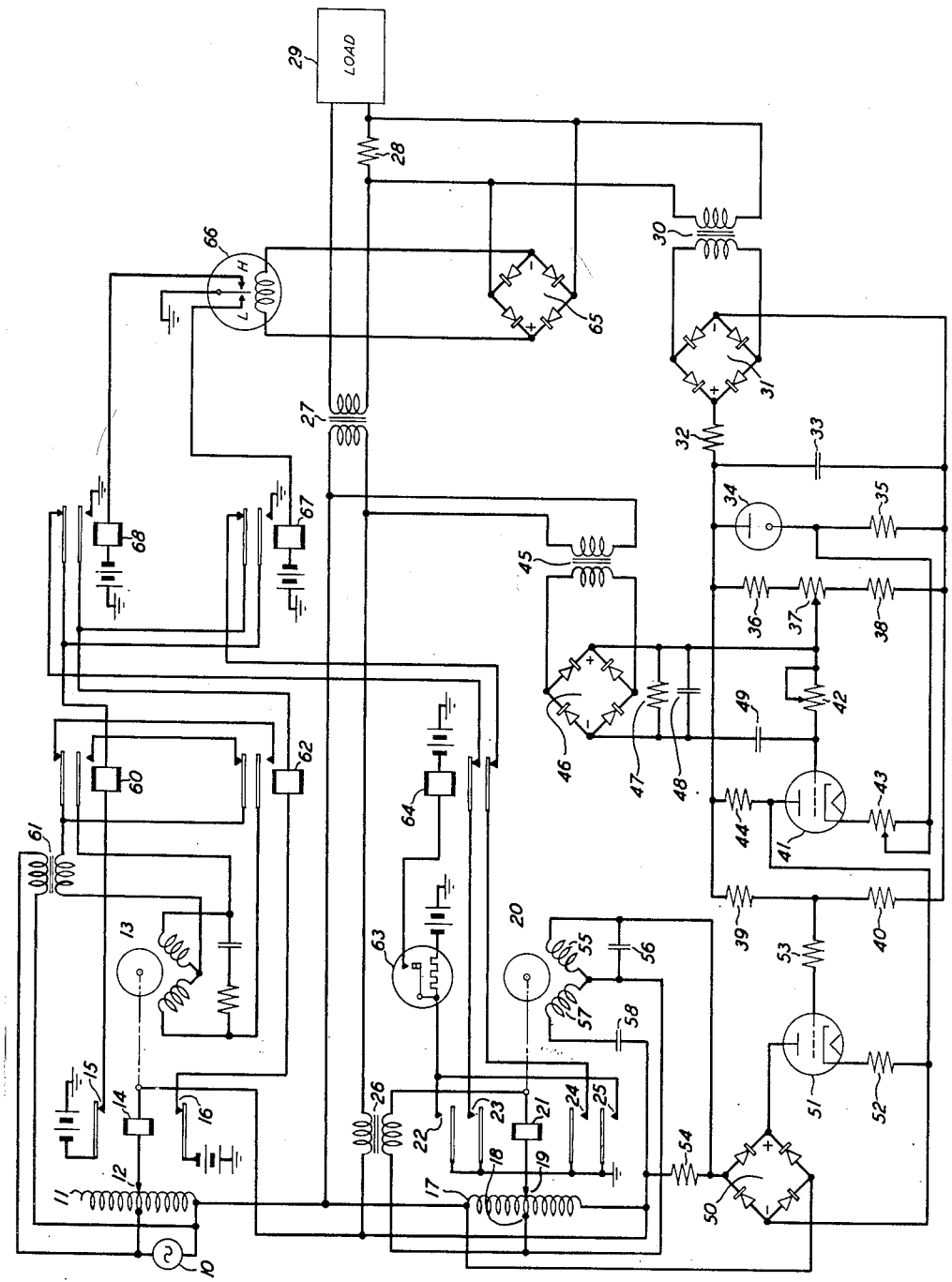

2,619,631

UNITED STATES PATENT OFFICE 2,619,631

REGULATING APPARATUS

Billy H. Hamilton, Orange, and Harry H. Spencer, Springfield, N. J., assignors to Bell Telephone Laboratories, Incorporated, New York, N. Y., a corporation of New York Application September 14, 1951, Serial No. 246,598

9 Claims. (Cl. 323—47)

This invention relates to regulating apparatus and particularly to apparatus for regulating the current supplied from an alternating-current source to a load to minimize amplitude changes of said load current.

An object of the invention is to provide improved apparatus for regulating the current supplied from an alternating-current supply source to a load.

In a specific embodiment of the invention herein shown and described for the purpose of illustration, there are provided for controlling the current supplied from an alternating-current supply source to a load, a first and a second autotransformer each having a variable motor-driven tap or brush, current being supplied from the supply source to the first transformer. The first autotransformer is a part of a relatively slow-acting, coarse control and the second autotransformer is part of a relatively fast-acting, fine control. The output voltage of the first autotransformer, determined by the position of its variable tap, is impressed upon the second autotransformer. The output of the first autotransformer is also connected in series with the secondary winding of a buck-boost transformer to the load circuit, the primary of the buck-boost transformer being connected to a mid-terminal and to the variable tap of the second autotransformer. During normal operation, load current changes are minimized by controlling the energization of the motor for driving the variable tap of the second autotransformer in response to load current changes. To maintain the variable tap of the second autotransformer within a desired operating range, there is provided a cam switch driven by the motor associated with the second autotransformer for completing circuits for energizing the motor associated with the first autotransformer when the limits, respectively, of the normal operating range are reached. If for any reason the apparatus for controlling the energization of the motor which drives the tap of the second autotransformer in response to load current changes should fail to operate correctly, the brush of the second autotransformer would be driven to an extreme position. Under this abnormal condition, the means for controlling the energization of the motor associated with the first autotransformer to maintain the variable tap of the second autotransformer within a desired operating range is deenergized, after a short delay period, and alternative means are substituted for controlling the energization of the motor associated with the first autotransformer. The load current is then controlled by the first autotransformer alone but this control is less accurate than that obtained under normal operating conditions when both variable autotransformers are functioning to regulate the load current.

The specific apparatus shown and described herein for controlling the energization of the motor for driving the variable tap of the second autotransformer in response to load current changes is disclosed and claimed in a copending application of J. R. Stone, Serial No. 243,726, filed August 25, 1951.

The single figure of the accompanying drawing is a schematic view of a current supply apparatus embodying the invention.

Referring to the drawing, alternating current from a supply source 10 is supplied to the winding of an autotransformer 11 having a variable tap or brush 12 driven by a two-phase motor 13. The motor 13 also drives a cam 14 for operating switches 15 and 16. The output voltage of autotransformer 11, measured between an end terminal and the tap 12, is impressed across the winding of a second autotransformer 17 having a mid-terminal 18 and a variable tap or brush 19 driven by a two-phase motor 20. The motor 20 also drives a cam 21 for operating switches 22, 23, 24 and 25. Current from source 10 is supplied through autotransformer 11 and through the secondary of a buck-boost transformer 26 to a load circuit comprising a transformer 27 the secondary of which is connected through a resistor 28 to a load 29, the primary of buck-boost transformer 26 being connected to the mid-terminal 18 and variable tap 19 of autotransformer 17. The voltage impressed upon the primary of transformer 27 in the load circuit is thus equal to the output voltage of transformer 11 plus or minus a voltage proportional to the output voltage of transformer 17. The voltage across resistor 28 is proportional to the current supplied to the load 29.

The voltage across resistor 28 is stepped up by a transformer 30, the secondary of which is connected to the input terminals of a bridge rectifier 31. The output current of the rectifier 31 is filtered by the series resistor 32 and the shunt condenser 33 to suppress ripple components thereof and the filtered current is supplied to three parallel branch paths, a first of the branch paths comprising a cold cathode, gas-filled constant voltage tube 34 in series with a resistor 35, a second branch path comprising a resistor 36, a potentiometer 37 and a resistor 38, all in series, and the third path comprising resistors 39 and 40 in series. There is provided a space current amplifier tube 41 having its control grid connected through a rheostat 42 to the variable tap of potentiometer 37 and having its cathode connected through a rheostat 43 to a common terminal of constant voltage tube 34 and resistor 35. The anode of tube 41 is connected through a resistor 44 to the positive output terminal of the rectifier and filter 31, 32, 33. There is provided a transformer 45 having a primary winding connected across the primary of transformer 27 and a secondary winding connected to the input of a bridge rectifier 46. There are connected across the output of rectifier 46 three parallel current paths a first of which comprises a resistor 47 of 0.1 megohm, for example, a second of which comprises a condenser 48 of 10 microfarads, for example, and the third of which comprises a condenser 49 of 2 microfarads and in series therewith the rheostat 42 of 0.1 megohm, for example. The voltage impressed upon the grid-cathode circuit of tube 41 has two components. The one component voltage, equal to the difference between the voltage across resistor 36 and a portion of potentiometer 37 and the relatively constant voltage across tube 34, has variations corresponding to changes of current supplied to the load. The second component voltage across rheostat 42 varies in accordance with the rate of change of voltage impressed upon the load circuit.

There is provided a bridge rectifier 50 to the output terminals of which are connected in series the space current path of a space current device 51 and a cathode resistor 52. The grid-cathode circuit of tube 51 comprises in series a resistor 53 and resistors 39, 44 and 52. The resistance of the space current path of tube 51 is thus varied in response to changes of output voltage of amplifier 41 across resistor 44. The input terminals of rectifier 50 are connected through a circuit comprising a resistor 54 to the end terminals of autotransformer 17. The amplitude of the alternating current flowing through resistor 54 is varied in response to resistance changes of the space current path of tube 51.

The motor 20 has a winding 55, across which a condenser 56 is connected, and a winding 57. The energizing circuit for winding 57 comprises a half portion of the winding of autotransformer 17 and condenser 58 in series. The resultant voltage impressed upon winding 55 of the motor 20 comprises two component voltages which are opposed in phase, the first component voltage being that across the lower half of autotransformer 17 and the second component voltage being that across resistor 54. When these component voltages are of equal amplitude, no current will be supplied to motor winding 55 and no torque for causing motor rotation will be produced. The direction of rotation of the motor 20 will depend upon the phase of the resultant voltage impressed upon winding 55, the resultant voltage having one phase when the voltage across resistor 54 is the larger of the two component voltages and the resultant voltage having the opposite phase when the voltage across resistor 54 is the smaller of the two component voltages. The speed of the motor rotation is dependent on the amplitude of the resultant voltage.

If the current supplied to the load 29 decreases due to a decrease of the voltage of source 10, for example, the alternating voltage across resistor 28 and the direct voltage at the output of rectifier 31 and filter 32, 33 each decreases. The resulting voltage decrease across resistor 36 and a portion of potentiometer 37 is such as to make the control electrode of tube 41 relatively more positive or less negative with respect to its cathode. Moreover, when the alternating input voltage of rectifier 46 and its direct output voltage decrease, previously charged condenser 49 discharges through a circuit comprising rheostat 42 so that there is introduced a transient voltage component such as to make the control grid of tube 41 relatively more positive with respect to the cathode potential, the magnitude of this transient component increasing with increase of the rate of change of the voltage impressed upon rectifier 46. The transient voltage component may be adjusted by means of the rheostat 42 and the relatively steady voltage component may be adjusted by means of the potentiometer 37. Thus the relative values of the two voltage components may be adjusted to control the sensitivity of the regulating apparatus. The increase of space current of tube 41 flowing through resistor 44 causes the cathode of tube 51 to become more negative with respect to its control electrode, thus causing the resistance of the space current path of tube 51 to decrease. The resulting increase of alternating voltage across resistor 54 causes to be impressed upon winding 55 of motor 20 a voltage of such phase that the motor drives the brush 19 in a direction to cause the voltage across transformer 26 to boost the voltage across the load circuit, thereby increasing the current supplied to the load and increasing the voltage supplied to rectifier 46. For this condition, charging current for condenser 49 flows through rheostat 42 to make the grid of tube 41 more negative. The rate of increase of voltage across resistor 54 is thus limited to prevent the motor 20 from driving the brush 19 of the autotransformer beyond the position required for bringing the load current to a preselected amplitude. Overshooting and hunting of the regulating system are thus prevented. As the load current increases, the resistance of the space current path of tube 51 increases until, when the normal value of load current is reached, zero voltage is impressed across motor winding 55 and the motor stops. Similarly, when the motor drives the brush 19 in a direction to decrease the voltage supplied to the load circuit, the rate of change of the voltage impressed upon motor winding 55 is limited so as to prevent a decrease of load voltage greater than that required to bring the load current to the desired normal amplitude.

The portion of the regulating apparatus comprising autotransformer 17 and buck-boost transformer 26 is a fast-acting, fine control which can buck or boost the voltage supplied from autotransformer 11 to the load circuit by as much as 10 per cent in either direction. The motor-driven autotransformer 11 and its control relays are a slower-acting, coarse control the output voltage of which can vary from zero to about 110 per cent of the normal voltage across the primary of transformer 27. The autotransformer 11 functions only to keep the brush 19 of autotransformer 17 within a normal operating range or, if the fine control fails, to take over the regulating function.

If the voltage supplied to transformer 27 is required to be raised more than certain amount above the normal voltage, say, more than 3 per cent, the cam 21 will engage the switch 23 to cause it to complete an energizing circuit for a relay 60. The operation of relay 60 completes a circuit for energizing motor 13 from source 10 through a transformer 61, causing the motor to drive the brush 12 in a direction to increase the voltage impressed across autotransformer 17. While the motor 13 is running in a direction to increase the load voltage and load current, and as a result has overcorrected the normal voltage, a control voltage is supplied to winding 55 of motor 20 to cause it to drive the brush 19 in a direction to decrease the voltage supplied to the load circuit. Thus the cam 21 will be driven out of engagement with switch 23 and the relay 60 will be deenergized to cause motor 13 to stop. Similarly, if the load voltage is required to be reduced more than 3 per cent below the normal value, cam switch 24 will be closed to complete an energizing circuit for a relay 62 which completes an energizing circuit for causing motor 13 to run in the reverse direction so as to lower the output voltage of autotransformer 11. As a result of the reduced load current, motor 20 is energized and drives the cam 21 in a direction to open the switch 24, thereby deenergizing relay 62 and motor 13.

If for any reason, such as a tube failure, the control circuit for motor 20 should not function correctly, the brush 19 and cam 21 would be driven to an extreme position and cause one of the limit switches 22 or 25 to be closed. A circuit would thus be completed for energizing a time delay relay 63 which, after a delay period of thirty seconds, for example, would operate to close a circuit for energizing a relay 64. The circuits for controlling the energization of motor 13 in response to the closure of switch 23 or switch 24 are thereby opened by relay 64.

During a period when the fine control is not functioning to regulate the load current, the regulating function is taken over by the coarse control. For this purpose there is provided control apparatus comprising a rectifier 65 having an input connected across resistor 28 and relays 66, 67 and 68. If the load current increases by more than 3 per cent, for example, the output current of rectifier 65 supplied to the winding of relay 66 is sufficient to operate the relay to its H contact. As a result, relay 68 is energized to cause it to open a circuit path from relay 64 to relay 60 and to close an energizing circuit for relay 62. As previously explained, the operation of relay 62 completes an energizing circuit for motor 13 to cause it to run in a direction to reduce the output voltage of autotransformer 11, thereby tending to reduce the load current to normal value. Similarly, if the load current is reduced more than 3 per cent below normal value, the L contact of relay 66 is closed to cause the operation of relay 67. As a result, relay 60 is energized and motor 13 is energized to cause it to drive the brush 12 in a direction to increase the load voltage and thereby tend to bring the load current to normal operating value.

The gain of amplifier tube 41 may be adjusted by means of the rheostat 43. As the resistance of rheostat 43 is increased, a greater change of control voltage is required to be impressed upon the grid-cathode circuit to produce a certain change of space current in tube 41. By thus adjusting the gain of the amplifier, the regulating limits of the load current may be controlled. Adjustment of the normal operating load current can be made by changing the variable tap of potentiometer 37. The effectiveness of the antihunt circuit may be adjusted by means of the rheostat 42. When the rheostat 42 is adjusted for zero resistance, the antihunt circuit is completely ineffective. When the rheostat is set for maximum resistance, the antihunt circuit will operate at maximum effectiveness and the response of the regulator will be slower than necessary especially when the rheostat 43 is set for maximum gain.

What is claimed is:

1. Means for controlling the supply of current from an alternating-current supply source to a load circuit comprising a first transformer means having a fixed terminal and a first movable contact, means for supplying current from said source to said first transformer means to set up an alternating voltage between said fixed terminal and said movable contact, a first motor for driving said first movable contact to vary said alternating voltage, a second transformer means having a second movable contact, means for impressing said alternating voltage upon said second transformer means, a second motor for driving said second movable contact, means for impressing upon said load circuit an output voltage derived from said second transformer means, means connected to said load circuit for controlling the energization of said second motor to thereby control said output voltage impressed upon said load circuit, means responsive to a predetermined displacement in one direction of said second movable contact from a certain position for controlling the energization of said first motor to cause it to rotate in one direction and means responsive to a predetermined displacement in the opposite direction of said second movable contact from said certain position for controlling the energization of said first motor to cause it to rotate in the reverse direction.

2. In combination, a first transformer means energized by current from an alternating-current supply source and having a first movable means for varying the output voltage of said first transformer means, a first reversible motor for driving said first movable means, a second transformer means having a second movable means for varying the output voltage of said second transformer means with respect to the input voltage impressed upon said second transformer means, a second reversible motor for driving said second movable means, means for impressing the output voltage of said first transformer means upon said second transformer means, means for impressing the output voltage of said second transformer means upon a load circuit, means for controlling the energization of said second reversible motor, and means driven by said second reversible motor for controlling the energization of said first reversible motor.

3. A combination in accordance with claim 2 in which there is provided means for supplying energizing current from said load circuit to said means for controlling the energization of said second reversible motor.

4. In combination, a first transformer means to which current is supplied from an alternating-current supply source, means comprising a first motor for changing the output voltage of said first transformer means with respect to the voltage of said supply source when said first motor is caused to rotate, a second transformer means, means for impressing the output voltage of said first transformer means upon the input of said second transformer means, means comprising a second motor for changing the output voltage of said second transformer means with respect to its input voltage when said second motor is caused to rotate, means for energizing said second motor to control its rotation, and means driven by said second motor for controlling the energization of said first motor to control its rotation.

5. In combination, a first transformer means to which current is supplied from an alternating-current supply source, means comprising a first motor for changing the output voltage of said first transformer means with respect to the voltage of said supply source when said first motor is caused to rotate, a second transformer means, means for impressing the output voltage of said first transformer means upon the input of said second transformer means, means comprising a second motor for changing the output voltage of said second transformer means with respect to its input voltage when said second motor is caused to rotate, means for impressing the output voltage of said second transformer means upon a load circuit, means responsive to the load current for controlling the energization of said second motor to cause the output voltage of said second transformer means to change in a direction to minimize changes of load current, and means for maintaining within predetermined operating limits the means for changing the output voltage of the second transformer means comprising means driven by said second motor for controlling the energization of said first motor to control its rotation and thereby to control the input voltage to the second transformer means.

6. In combination, a first transformer means to which current is supplied from an alternating-current supply source, means comprising a first motor for changing the output voltage of said first transformer means with respect to the voltage of said supply source when said first motor is caused to rotate, a second transformer means, means for impressing the output voltage of said first transformer means upon the input of said second transformer means, means comprising a second motor for changing the output voltage of said second transformer means with respect to its input voltage when said second motor is caused to rotate, means for impressing the output voltage of said second transformer means upon a load circuit, means responsive to the load current for controlling the energization of said second motor to cause the output voltage of said second transformer means to change in a direction to minimize changes of load current, a first control means for controlling the energization of said first motor comprising means driven by said second motor, a second control means for controlling the energization of said first motor in response to load current changes of abnormally large magnitude, and means responsive to the operation of said second control means for rendering said first control means inoperative.

7. In combination, a first autotransformer having a first movable brush, means for supplying current from an alternating-current supply source to said first autotransformer, a first reversible motor for driving said first brush to vary the output voltage of said first autotransformer, a second autotransformer having a second movable brush, means for impressing the output voltage of said first autotransformer upon the input of said second autotransformer, a second reversible motor for driving said second brush to vary the output voltage of said second autotransformer with respect to said input voltage impressed thereon, a buck-boost transformer having a primary and a secondary, means for impressing the output voltage of said second autotransformer upon the primary of said buck-boost transformer to set up a voltage across the secondary thereof, means for impressing upon a load circuit a voltage having as components the output voltage of said first autotransformer and the secondary voltage of said buck-boost transformer, means responsive to the current supplied to said load circuit for controlling the energization of said second reversible motor, thereby controlling the voltage impressed upon the load circuit to cause load current changes to be minimized, and means for maintaining the displacement of said second brush within predetermined operating limits comprising means driven by said second motor for causing said first motor to be energized to cause said first brush to be moved in one direction when said driven means reaches a predetermined displacement in one direction and for causing said first motor to be energized to cause said first brush to be moved in the opposite direction when said driven means reaches a predetermined displacement in the opposite direction.

8. A combination in accordance with claim 7 in which there are provided means responsive to an abnormally large change of load current for controlling the energization of said first motor to cause the output voltage of said first autotransformer to change in a direction to tend to reduce said load current change, said means comprising means for rendering inoperative the means for causing the first motor to be energized in response to a predetermined displacement in one direction or the other of the means driven by the second motor.

9. A combination in accordance with claim 7 in which there are provided means for rendering inoperative after a delay period the means for causing the first motor to be energized in response to a predetermined displacement in one direction or the other of the means driven by the second motor under an abnormal operating condition when said driven means reaches a displacement substantially greater than said predetermined displacement.

BILLY H. HAMILTON.
HARRY H. SPENCER.

No references cited.